US006771970B1

(12) United States Patent
Dan

(10) Patent No.: US 6,771,970 B1
(45) Date of Patent: Aug. 3, 2004

(54) LOCATION DETERMINATION SYSTEM

(75) Inventor: Meir Dan, Tel Aviv (IL)

(73) Assignee: Locationet Systems 2000 Ltd., Natanya (IL)

( * ) Notice: Subject to any disclaimer, the term of this patent is extended or adjusted under 35 U.S.C. 154(b) by 534 days.

(21) Appl. No.: 09/677,827

(22) Filed: Oct. 2, 2000

Related U.S. Application Data

(60) Provisional application No. 60/157,643, filed on Oct. 4, 1999.

(51) Int. Cl.[7] .................... H04Q 7/20

(52) U.S. Cl. .................... 455/456.1; 455/456.2; 455/456.3; 455/456.5; 455/457; 342/357.1; 342/357.14; 342/357.15

(58) Field of Search .................... 455/456.1, 457, 455/456.2, 456.3, 456.5; 340/988, 989, 990, 991, 993; 701/208, 212, 213, 200, 207; 342/357.1, 357.14, 357.15

(56) References Cited

U.S. PATENT DOCUMENTS

| | | | | | |
|---|---|---|---|---|---|
| 5,223,844 | A | | 6/1993 | Mansell et al. | 342/357 |
| 5,848,373 | A | | 12/1998 | DeLorme et al. | 701/200 |
| 6,087,952 | A | * | 7/2000 | Prabhakaran | |
| 6,131,067 | A | * | 10/2000 | Girerd et al. | |
| 6,222,483 | B1 | * | 4/2001 | Twitchell et al. | |
| 6,330,454 | B1 | * | 12/2001 | Verdonk | |

FOREIGN PATENT DOCUMENTS

| | | |
|---|---|---|
| DE | 44 27 913 A1 | 2/1996 |
| EP | 0 785 535 A1 | 7/1997 |
| WO | WO 98/20434 | 5/1998 |

OTHER PUBLICATIONS

International Search Report; International Application No. PCT/IL 00/ 00617; Feb. 9, 2001.

* cited by examiner

*Primary Examiner*—Erika Gary
*Assistant Examiner*—Huy Nguyen
(74) *Attorney, Agent, or Firm*—Fitch, Even, Tabin & Flannery

(57) ABSTRACT

A system for location tracking of mobile platforms, each mobile platform having a tracking unit is described. The system includes a location determination system communicating through a user interface with at least one subscriber; said communication including inputs that include the subscriber identity and the identity of the mobile platform to be located; a communication system communicating with said location determination system for receiving said remote platform identity; and, a plurality of remote tracking systems communicating with said communication system for determining the location of the remote platform;

The communication system is arranged to determine an appropriate one of the plurality of remote tracking systems and to communicate said remote platform identity, the appropriate remote tracking system receiving said mobile platform identity and returning mobile platform location information, said communication system being arranged to pass said mobile platform location information to said location detention system. The location determination system is arranged to receive said mobile platform location information and to forward it to said subscriber.

19 Claims, 4 Drawing Sheets

Internet Browser
60

Authentication
Entities registered with system
Location request
Location and Map
50
1
Web Site
Request
Answer
Requesr
Answer
3
Request
Answer
Internet
Request
Answer
30
11
12
13
14
21
22
23
24

LOCATION DETERMINATION SYSTEM

This application claims the benefit of U.S. Provisional Application No. 60/157,643, filed Oct. 4, 1999.

FIELD OF THE INVENTION

The present invention is in the general field of location tracking services and is particularly suitable for vehicle tracking.

BACKGROUND OF THE INVENTION

Tracking the location of vehicles in large fleets is complex, expensive and time consuming. Technologies such as GPS (Global Positioning System), EOTD (Enhanced Observed Time Difference), Cell ID, AMPS (Advanced Mobile Phone Service), GSM (Global System for Mobile Communication), CDPD (Cellular Digital Packet Data), EDACS (Enhanced Digital Access Communication System) and MSAT (Mobile Satellite communications) allow a vehicle, mobile telephone or other mobile entity to be located. The mobile entity has a communication device from which the location of the entity can be determined. In order to locate an entity, a base station communicates with a communication system such as a satellite in orbit or an array of transmitter/receivers, which in turn triangulates the position of the entity. This is technically complicated process requiring expensive equipment and access to expensive resources such as satellite time. Organizations with a need for instantaneous information on the whereabouts of their vehicles normally employ the services of a location tracking service provider. Such service providers offer access to the equipment and technology necessary to locate the vehicles to a number of organisations. An authorised member of an organisation subscribing to one of the service providers is able to submit a request for a location of one of the organisation's vehicles to the service provider's system. The location of the vehicle is determined and returned to the requestor. However, due to the complexity of the underlying systems, communication with a service provider's systems is normally made via expensive and complex client software. Each service provider collects data using different technologies and stores this data in its own proprietary format. In addition, many service providers have their own proprietary communication formats in which position requests must be made and in which location data is received. This results in confusion for customers who need to consider the various advantages, disadvantages and cost implications associated with each of the various location systems offered by service providers. Furthermore, the software is usually so complex that only a few trained personnel in every organization can operate the vehicle tracking software. The software is often resource-heavy, expensive and not intuitive for the users. Retrieval of data can only be done from a few terminals thereby making the information specialized and highly inaccessible. Furthermore, the differences in proprietary data and communication formats make it extremely difficult for an organisation to customise the client software or to develop systems capable of communicating with the service provider's systems and accepting the location is data.

There is accordingly a need in the art to simplify the process by allowing inter alia extraction of information from multiple tracking service providers. There is a further need in the art to provide a relatively simple to operate location tracking service adapted for use by common subscribers whilst obviating the need to install and use a cumbersome vehicle tracking software.

SUMMARY OF THE INVENTION

According to one aspect of the present invention, there is provided a system for location tracking of mobile platforms, each mobile platforms having a tracking unit; the system including:

a location determination system communicating through a user interface with at least one subscriber; said communication including inputs that include the subscriber identity and the identity of the mobile platform to be located;

a communication system communicating with said location determination system for receiving said remote platform identity; and, a plurality of remote tracking systems communicating with said communication system for determining the location of the remote platform;

wherein said communication system is arranged to determine an appropriate one of the plurality of remote tracking systems and to communicate said remote platform identity, the appropriate remote tracking system receiving said mobile platform identity and returning mobile platform location information, said communication system being arranged to pass said mobile platform location information to said location determination system;

said location determination system being arranged to receive said mobile platform location information and to forward it to said subscriber.

The location determination system may communicate with a mapping system having at least one map database, said mapping system accepting mobile platform location information, correlating said location information with a location on a map from said at least one map database, generating a map on which said location is marked and communicating said map to said location determination system, wherein said location determination system is arranged to forward said map to said subscriber.

The mapping system may communicate with at least location information system, said location information system accepting mobile platform location information, obtaining location information and returning said location information for association with said map.

The location information system may obtain location information from selected ones of traffic information systems, electronic Yellow Page databases, video databases, L-commerce systems and free advertising systems.

The map database may include maps formatted as at least one of the following: Raster Map in various scales, vector maps and air photo.

The user interface may accept multiple mobile platforms to be located, the mapping system accepting multiple mobile platform location information and generating a map on which each location is marked.

Data forwarded to said subscriber may comprise at least one mobile platform location in a map represented in HTML and an image.

Communication between said subscriber and said location determination system may be over the Internet.

Communication between said communication system and the corresponding remote tracking service is over the Internet.

The location determination system, the mapping system and the communication system may be accommodated in the same web site.

A mobile platform may be a vehicle, a person, a portable computer, a mobile telephone or any other mobile entity that can be tracked or have a tracking device installed or attached.

Each remote tracking system may belong to a different company and supervises a different group of mobile platforms.

According to another aspect of the present invention, there is provided a method of determining the location of remote platforms, said remote platforms between them being locatable by a plurality of remote tracking systems, the method comprising the steps of:

(a) accepting inputs from a subscriber identifying one or more remote platforms to be located;
(b) determining for each remote platform one of the remote tracking systems that is capable of locating said remote platform;
(c) communicating the identity of the one or more remote platforms to be located to the determined remote tracking system(s);
(d) receiving the location of each remote platform from the respective remote tracking system; and,
(e) transmitting the location of each remote platform to said subscriber.

Step (e) may further comprise the step of correlating the location of each remote platform with a map database and transmitting a map having marked said remote platform location(s) to said subscriber.

BRIEF DESCRIPTION OF THE DRAWINGS

For a better understanding, the invention will now be described, by way of example only, with reference to the accompanying drawing, in which.

DETAILED DESCRIPTION OF A PREFERRED EMBODIMENT

Figure 1:
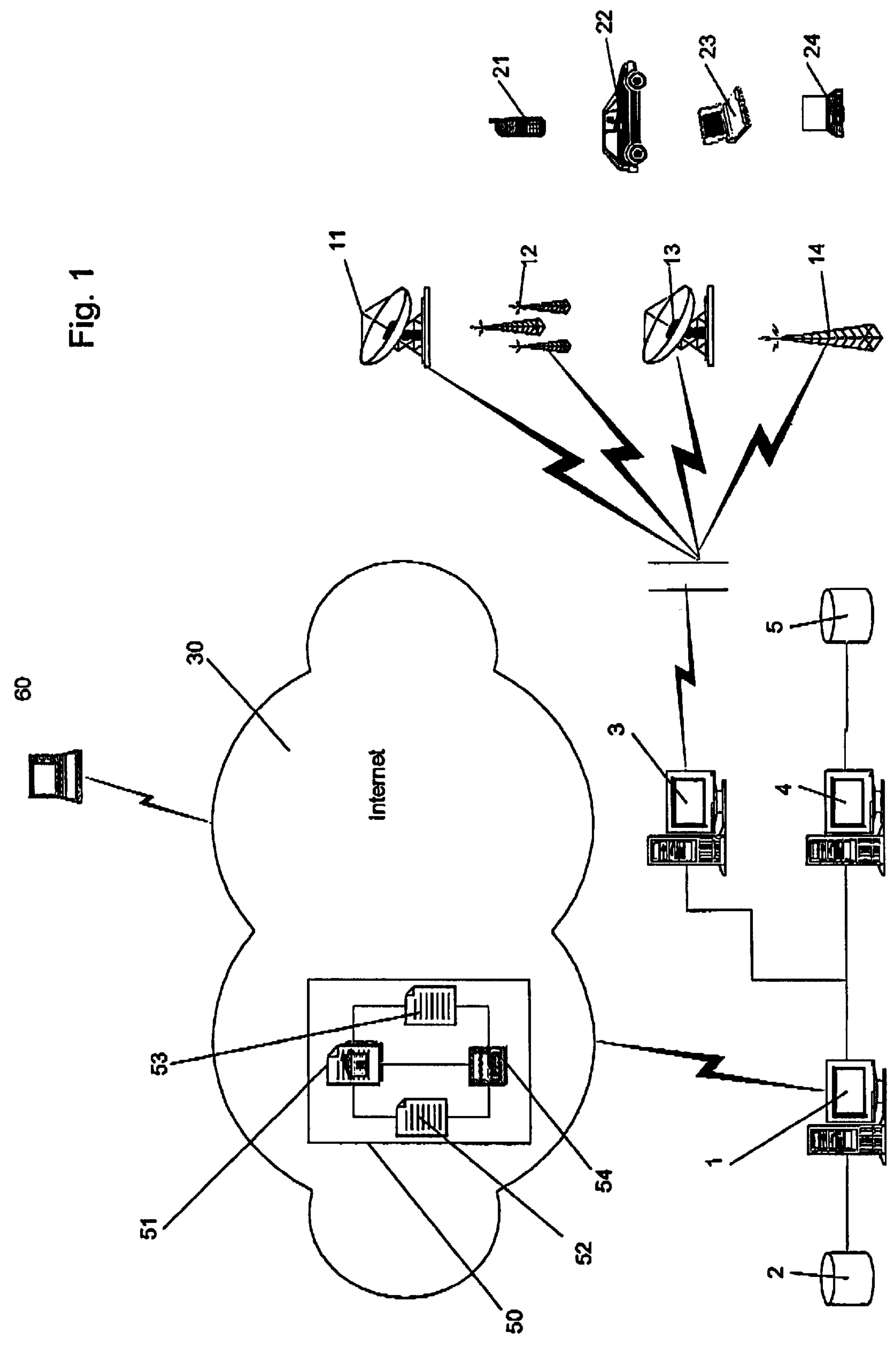
FIG. 1 is a schematic diagram of a location tracking system in accordance with the invention.

Turning first to FIG. 1, there is shown a schematic diagram of a location determination system (1) in accordance with the invention. In the example of FIG. 1, there are Z location tracking service providers (referred to also as service providers), each offering access to a respective location tracking system. For the purposes of this example only 4 location tracking systems are shown (designated generally as (11), (12), (13) and (14)). One of the location tracking systems may be, for example, a Motorola tracking location system such as systems based around Motorola's MLU (Mobile Logic Unit). Other location tracking systems may be based around, for example, the Ituran VLU (Vehicle Logic Unit) or PAL (Personal Alarm and Location) or Nexus Telocation's RMU (Remote Monitoring Unit) based system.

For the purpose of tracking vehicles, each vehicle is preferably equipped with an individual tracking unit (not shown). Most mobile telephones already have appropriate functionality to interact with the location tracking systems. Other entities such as people, computers, briefcases or other valuables to be tracked require a tracking unit to be in-built or carried. The tracking unit, or equivalent, transmits data via a wireless data transmission protocol, such as GSM radio transmissions to the associated location tracking service provider.

Between them, the systems (11–14) are capable of tracking the location of one or more vehicles, mobile telephones or other entities. These are shown in this example as a mobile telephone (21), a car (22), a laptop computer (23) and a briefcase (24).

The systems (11–14) of the various location tracking service providers communicate over the Internet (30) with a communication subsystem (3) of the location determination system (1). Communication is made using, typically, a communication protocol specific to each location tracking system provider.

The location determination system (1) is linked to a user database that cross-references vehicles and other entities to be tracked with the location tracking service that is capable of tracking them. The location determination system (1) is also linked to a map server (4) operating a map engine for accessing a map database (5). The map server (4) is capable of correlating between maps stored in the database (5) and positioning information received from the respective location tracking system (11–14). The map server (4) may support various types of maps, such as, for example, Raster maps in various scales, vector maps and air photographs.

In a prefer red non-limiting embodiment of the invention, the location determination system (1) hosts a World Wide Web site (50) on the Internet (30). The Web site (50) includes a home page (51) operating as the entry point to the Web site (50) for visitors, information pages (52–53) and a service access form (54).

Figure 2:
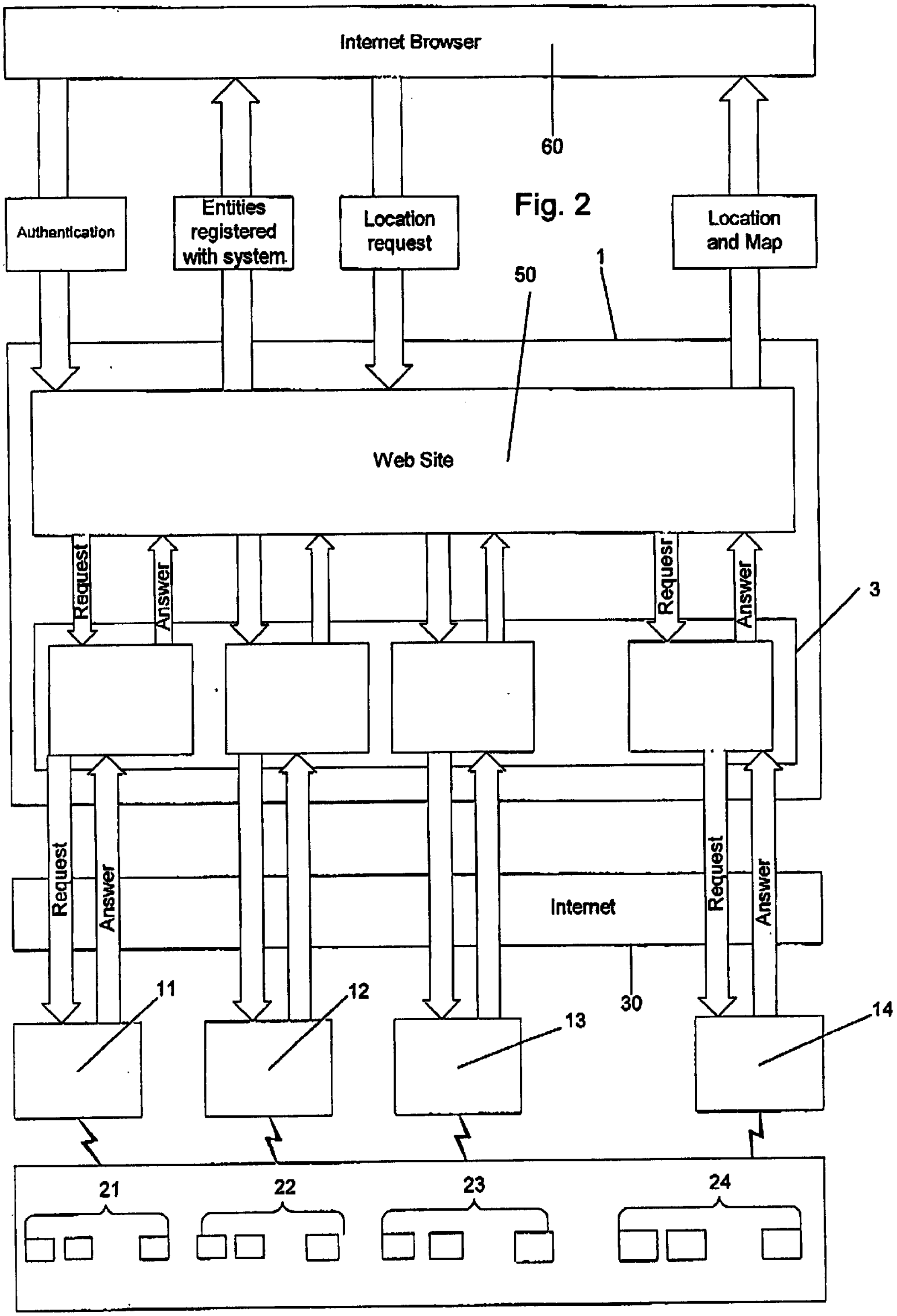
FIG. 2 is a schematic diagram illustrating the operation of the system of FIG. 1.

FIG. 2 is a schematic diagram illustrating the operation of the system of FIG. 1. A subscriber to the location determination system (1) equipped with a computer (60) running an Internet browser requests the location of a specific vehicle (22). The subscriber can be a stand-alone user or, for example, a member of a number of licensed subscribers in a given organization, all as required and appropriate.

The user logs on to the Web site (50) and selects the vehicle (22) for which the location is sought via the service access form (54). The request is passed from the Web site (50) to the location determination system (1) which accesses a database (2) to determine the appropriate location tracking system (11–14) for the vehicle. The location determination system (1) passes the request and details of the appropriate location tracking system (11–14) to the communication subsystem (3).

The communication subsystem (3) formats the request for transmission to the respective location tracking system (11–14) and transmits it via the Internet (30). The location tracking system (11–14) receives the request and determines the location of the vehicle (22). This information is then transmitted back to the communication subsystem (3) via the Internet (30). Upon receipt of the information, the communication subsystem (3) associates the information with the request and passes it to the location determination system (1). The location determination system (1) passes the location of the vehicle (22) to the map server (4) which obtains a map of the area in which the vehicle (22) is located using the map engine, marks the position of the vehicle (22) on the map and passes it to the location determination system (1). The map is then passed via the Internet (30) to the Web browser running on the subscriber's computer (60).

Figure 3:
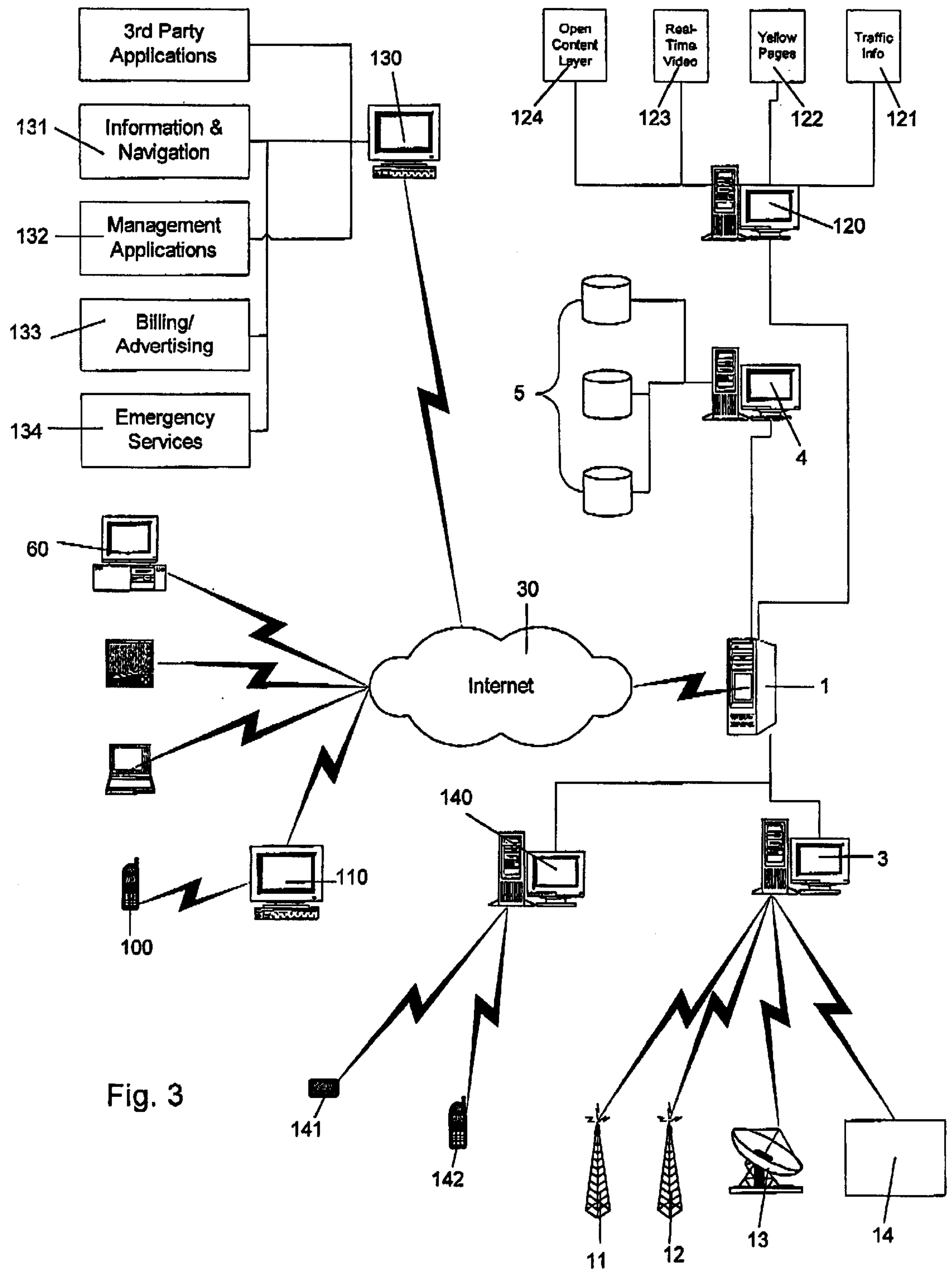
FIG. 3 is a schematic diagram of the system of FIGS. 1 and 2 illustrating preferred features of the invention; and, FIGS. 4*a* and 4*b* are schematic diagrams illustrating protocol data units used in a preferred embodiment of the invention.

FIG. 3 is a schematic diagram of the system of FIGS. 1 and 2 illustrating preferred features of the invention.

In addition to the Web site (50), the location determination system (1) may host a WML-based Web site (not shown) on the Internet (30). WAP-enabled mobile telephones (100) and other communication devices can communicate via a WAP server (110) to submit location requests and receive location maps or coordinates.

The map server (4) may be linked to map databases (5) in formats such as Raster, Vector, Topographic or aerial photographs. In addition, data related to the determined location could also be incorporated in the output. A location data server (120) may be linked to a number of location databases, examples of which include traffic information databases (121), Yellow Pages databases (122) and databases of video of the location (123). In addition, the location data server may accept connections and/or data from external data providers via an open content layer (124) that establishes a standard data communication protocol. As an automatic procedure, or upon request of a subscriber, selected or all data on the location determined by the location determination system (1) that is available from the databases is obtained from the location data server (120) by the map server (4) and incorporated in the output map.

The location data received by a subscriber is normally an HTML representation of the information requested. This representation may be composed of, for example, HTML and a GIF (image) component. Of course the invention is not limited to the specific user interface data, which could be made up of, or converted to, any appropriate format.

Preferably, multiple requests for the location of the same entity are detected and processed as one request, the location data being sent to both parties. Multiple requests from one subscriber may be processed so that the locations of the entities are superimposed on one map. Alternatively, each request may result in a location map being displayed in a separate window.

In addition to supplying map-based location data to requesting Web browsers, the location determination system (1) may also be configured to communicate with external application servers (130) via the Internet, PSTN or other communication medium. The application server may run a proprietary or commercial software system for, for example, supplying navigation information (131), managing movement of resources (132), such as for route planning between multiple destinations, billing and/or advertising (133) and emergency service management (134). The data supplied to the application server (130) may include maps or may just be location coordinates in a predetermined format. The location determination system (1) may also communicate location data to non-Internet based clients. For example, it may be linked to an SMS (Simple messaging service) server (140) and supply locations as coordinates, street names derived from map databases or other location data available to mobile telephones (141), pagers (142) etc.

It is preferred that the communication subsystem (3) is an XML server. Communication with location tracking systems (11–14) is preferably asynchronous. In this manner, as no communication channel or session is held open while the location is determined (which may take anywhere from a few seconds to a number of minutes), the use of system resources and communication costs are limited without any negative effect on the response time of the system.

Figure 4A:
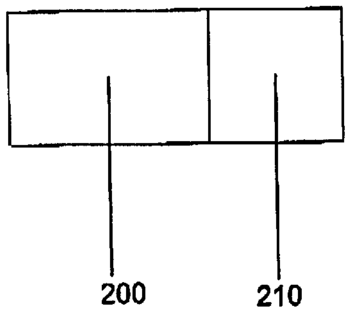
Figure 4B:
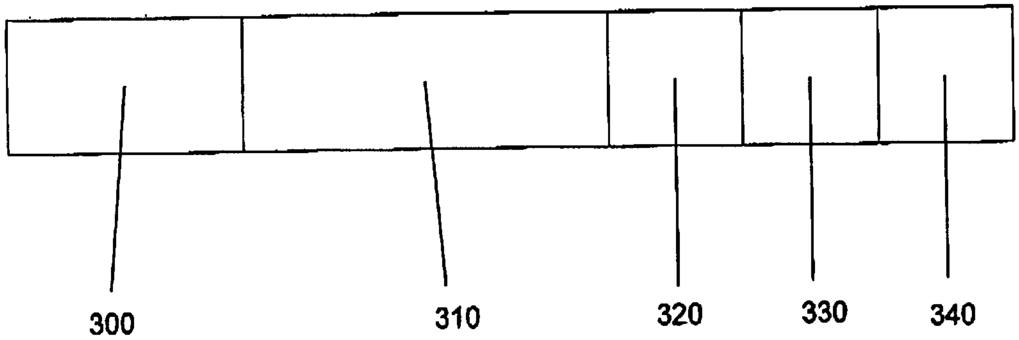

Communication between the communication subsystem (3) and location tracking system (11–14) is preferably made using an open format communication protocol. The protocol is illustrated in the schematic diagram of FIGS. 4*a* and 4*b*. In FIG. 4*a*, a request protocol data unit is shown. The data unit is transmitted by the communication subsystem (3) to the respective location tracking system (11–14) and includes the field ItemID (200), which contains the location tracking system's identifier of the item to be located. The data unit may also contain a timeslot field (210) designating a point in time for which the location of the item is requested. In FIG. 2*b*, a location data unit is shown. The data unit is transmitted from the respective tracking system (11–14) to the communication subsystem (3) and includes the fields ItemID (300) and Coord (310). The Coord field (310) may be in Latitude/Longditude format or in UTM formal The data unit may include the optional fields of Accuracy (320) indicating the location accuracy in Meters and Date (330) and Time (340) fields indicating the date and time at which the item was at the specified location.

If necessary, a translation system may be installed at location tracking systems that are not compatible with the open format communication protocol in order to intercept requests from the communication subsystem (3), convert the request to the location tracking system's proprietary format and to convert the location data from the location tracking service back into the open format for transmission to the communication subsystem (3).

The description above exemplifies the simplicity and flexibility of the system over hitherto known solutions. Thus, a single subscriber can access from his home computer (equipped with commercially available browser) a web site (50) and inquire as to location of vehicles or other entities of interest Obviously, the vehicles or entities may be spread among more than one company (e.g. they may belongs to different groups (21) to (24), each supervised by a respective different location company). Consider that the operational center communicates with the Company Location Systems over the Internet; the sought vehicles may be located in remote locations not necessarily in the same country or to even continent.

The application of the present invention is not bound to motor vehicles and may used for any mobile platform, e.g. for tracking persons.

Whilst the examples described have separated the functionality of the location determination system into a number of computer servers, databases and is modules, it will be apparent that the functionality of the system could be provided by a single appropriately programmed computer server. Alternatively, the functionality could be further divided across a number of computer servers that may be in remote locations.

The present invention has been described with a certain degree of particularity but various alternations and modifications may be carried out without departing from the spirit and scope of the following claims.

What is claimed is:

1. A system for location tracking of mobile platforms, each mobile platform having a tracking unit; the system including:

a location determination system communicating through a user interface with at least one subscriber; said communication including inputs that include the subscriber identity and the identity of the mobile platform to be located;

a communication system communicating with said location determination system for receiving said mobile platform identity; and, a plurality of remote tracking systems communicating with said communication system each of the remote tracking systems being adapted to determine the location of a respective mobile platform according to a property that is predetermined for each mobile platform for determining the location of the mobile platform;

wherein said location determination system is arranged to determine an appropriate one of the plurality of remote tracking systems, the appropriate remote tracking system receiving said mobile platform identity from said communication system and returning mobile platform location information, said communication system being arranged to pass said mobile platform location information to said location determination system;

said location determination system being arranged to receive said mobile platform location information and to forward it to said subscriber.

2. A system according to claim 1, wherein said location determination system communicates with a mapping system having at least one map database, said mapping system accepting mobile platform location information, correlating said location information with a location on a map from said at least one map database, generating a map on which said location is marked and communicating said map to said location determination system, wherein said location determination system is arranged to forward said map to said subscriber.

3. A system according to claim 2, wherein said mapping system communicates with at least one location information system, said location information system accepting mobile platform location information, obtaining location information and returning said location information for association with said map.

4. A system according to claim 3, wherein said location information system obtains location information from selected ones of traffic information systems, electronic Yellow Page databases, video databases, L-commerce systems and free advertising systems.

5. A system according to claim 2, wherein said map database includes maps formatted as at least one of the following: Raster Map in various scales, vector maps and air photo.

6. A system according to claim 2, wherein said user interface accepts multiple mobile platforms to be located, the mapping system accepting multiple mobile platform location information and generating a map on which each location is marked.

7. A system according to claim 2, wherein data forwarded to said subscriber comprises at least one mobile platform location in a map represented in HTML and an image.

8. A system according to claim 1, wherein the communication between said subscriber and said location determination system is over the Internet.

9. A system according to claim 1, wherein the communication between said communication system and the corresponding remote tracking service is over the Internet.

10. A system according to claim 1, wherein said location determination system, said mapping system and said communication system are accommodated in the same web site.

11. A system according to claim 1, wherein said mobile platform is a vehicle.

12. A system according to claim 1, wherein said mobile platform is a person.

13. A system according to claim 1, wherein each remote tracking system belongs to a different company and supervises a different group of mobile platforms.

14. A method of determining the location of mobile platforms, said mobile platforms between them being locatable by a plurality of remote tracking systems, each which is adapted to determine the location of a respective mobile platform according to a property that is predetermined for each mobile platform, the method comprising:

(a) accepting inputs from a subscriber identifying one or more mobile platforms to be located;

(b) determining for each mobile platform one of the remote tracking systems that is capable of locating said mobile platform;

(c) communicating the identity of the one or more mobile platforms to be located to the determined remote tracking system(s);

(d) receiving the location of each mobile platform from the respective remote tracking system; and (e) transmitting the location of each mobile platform to said subscriber.

15. A method according to claim 14, wherein transmitting the location of each mobile platform further comprises correlating the location of each mobile platform with a map database and transmitting a map having marked said mobile platform location(s) to said subscriber.

16. A computer program product comprising a computer useable medium having computer readable program code embodied therein to enable determination of the location of mobile platforms, said mobile platforms between them being locatable by a plurality of remote tracking systems, each which is adapted to determine the location of a respective mobile platform according to a property that is predetermined for each mobile platform, the computer readable program product comprising:

computer readable program code for causing a computer to accept inputs from a subscriber identifying one or more mobile platforms to be located;

computer readable program code for causing the computer to determine for each mobile platform one of the remote tracking systems that is capable of locating said remote platform;

computer readable program code for causing the computer to communicate the identity of the one or more mobile platforms to be located to the determined remote tracking system(s);

computer readable program code for causing the computer to receive the location of each mobile platform from the respective remote tracking system; and computer readable program code for causing the computer to transmit the location of each mobile platform to said subscriber.

17. A computer program product according to claim 16, further comprising computer readable code for causing the computer to correlate the location of each mobile platform with a map database and to transmit a map having marked said mobile platform location(s) to said subscriber.

18. A system for location tracking of mobile platforms, each of which is equipped each with a tracking unit, each being adapted to determine the location of a respective mobile platform according to a property that is predetermined for each mobile platform; the system comprising:

(a) a location server communicating through a user interface with at least one subscriber equipped with a browser; said communication having inputs that include at least the subscriber identity, the mobile platform identity and map information;

(b) at least one mobile platform location system coupled to said location server for receiving the mobile platform identity and map information that pertain to mobile platforms associated with the respective mobile platform location system; each one of said mobile platform location systems being associated with a map database and map engine for manipulating said map database;

(c) at least one remote tracking service communicating with said respective mobile platform location system for receiving mobile platform identity and returning mobile platform location information;

the at least one mobile platform location system being adapted to receive said mobile platform location information and access said map database for correlating map to said location information, so as to obtain correlated location information;

said location server being adapted to receive the correlated location information and forward them to said browser.

19. A program storage device readable by a machine, tangibly embodying a program of instructions executable by the machine to perform a method of determining the location of mobile platforms, said mobile platforms between them being locatable by a plurality of remote tracking systems, each of which is adapted to determine the location of a respective mobile platform according to a property that is predetermined for each mobile platform, the method comprising:

(a) accepting inputs from a subscriber identifying one or more mobile platforms to be located;

(b) determining for each mobile platform one of the remote tracking systems that is capable of locating said mobile platform;

(c) communicating the identity of the one or more mobile platforms to be located to the determined remote tracking system(s);

(d) receiving the location of each mobile platform from the respective remote tracking system; and (e) transmitting the location of each mobile platform to said subscriber.

* * * * *

US006771970C1

(12) EX PARTE REEXAMINATION CERTIFICATE (10744th)
United States Patent (10) Number: US 6,771,970 C1
Dan (45) Certificate Issued: Oct. 22, 2015

(54) LOCATION DETERMINATION SYSTEM

(75) Inventor: Meir Dan, Tel Aviv (IL)

(73) Assignee: LocatioNet Systems, Ltd.

Reexamination Request:
No. 90/013,370, Oct. 13, 2014

Reexamination Certificate for:
Patent No.: 6,771,970
Issued: Aug. 3, 2004
Appl. No.: 09/677,827
Filed: Oct. 2, 2000

Related U.S. Application Data

(60) Provisional application No. 60/157,643, filed on Oct. 4, 1999.

(51) Int. Cl.
*G08G 1/123* (2006.01)
*G08G 1/00* (2006.01)

(52) U.S. Cl.
CPC .......................................... *G08G 1/20* (2013.01)

(58) Field of Classification Search
None
See application file for complete search history.

(56) References Cited

To view the complete listing of prior art documents cited during the proceeding for Reexamination Control Number 90/013,370, please refer to the USPTO's public Patent Application Information Retrieval (PAIR) system under the Display References tab.

*Primary Examiner* — Minh T Nguyen

(57) ABSTRACT

A system for location tracking of mobile platforms, each mobile platform having a tracking unit is described. The system includes a location determination system communicating through a user interface with at least one subscriber; said communication including inputs that include the subscriber identity and the identity of the mobile platform to be located; a communication system communicating with said location determination system for receiving said remote platform identity; and, a plurality of remote tracking systems communicating with said communication system for determining the location of the remote platform;

The communication system is arranged to determine an appropriate one of the plurality of remote tracking systems and to communicate said remote platform identity, the appropriate remote tracking system receiving said mobile platform identity and returning mobile platform location information, said communication system being arranged to pass said mobile platform location information to said location detention system. The location determination system is arranged to receive said mobile platform location information and to forward it to said subscriber.

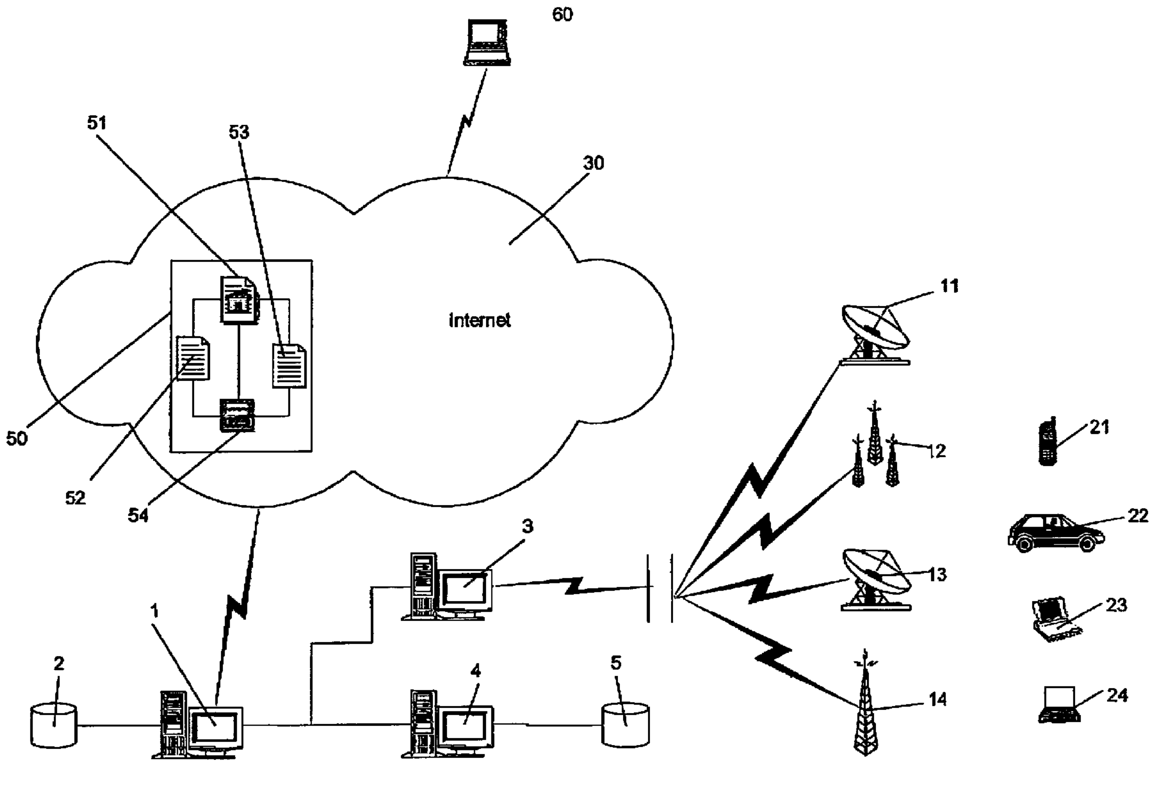

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-17 and 19 is confirmed.

New claims 20-42 are added and determined to be patentable.

Claim 18 was not reexamined.

*20. The system according to claim 1, wherein the property that is predetermined for each mobile platform for determining the location of the mobile platform is the remote tracking system's identifier of the mobile platform to be located.*

*21. The system according to claim 1, wherein each of the plurality of remote tracking systems includes the tracking unit of a mobile platform.*

*22. The system according to claim 21, wherein the tracking unit of a mobile platform is physically separated from the remote tracking system.*

*23. A system for location tracking of mobile platforms, each mobile platform having a tracking unit; the system including:*

*a location determination system communicating through a user interface with at least one subscriber; said communication including inputs that include the subscriber identity and the identity of the mobile platform to be located;*

*a communication system communicating with said location determination system for receiving said mobile platform identity; and,*

*a plurality of remote tracking systems communicating with said communication system each of the remote tracking systems being adapted to determine the location of a respective mobile platform according to a property that is predetermined for each mobile platform for determining the location of the mobile platform;*

*wherein the property that is predetermined for each mobile platform for determining the location of the mobile platform is the remote tracking system's identifier of the mobile platform to be located;*

*a user database linked to said location determination system for cross-referencing the mobile platforms to be tracked with the remote tracking systems capable of tracking them;*

*wherein said location determination system is arranged to determine an appropriate one of the plurality of remote tracking systems, the appropriate remote tracking system receiving said mobile platform identity from said communication system and returning mobile platform location information, said communication system being arranged to pass said mobile platform location information to said location determination system;*

*said location determination system being arranged to receive said mobile platform location information and to forward it to said subscriber.*

*24. A system according to claim 23, wherein said location determination system communicates with a mapping system having at least one map database, said mapping system accepting mobile platform location information, correlating said location information with a location on a map from said at least one map database, generating a map on which said location is marked and communicating said map to said location determination system, wherein said location determination system is arranged to forward said map to said subscriber.*

*25. A system according to claim 24, wherein said mapping system communicates with at least one location information system, said location information system accepting mobile platform location information, obtaining location information and returning said location information for association with said map.*

*26. A system according to claim 25, wherein said location information system obtains location information from selected ones of traffic information systems, electronic Yellow Page databases, video databases, L-commerce systems and free advertising systems.*

*27. A system according to claim 24, wherein said map database includes maps formatted as at least one of the following: Raster Map in various scales, vector maps and air photo.*

*28. A system according to claim 24, wherein said user interface accepts multiple mobile platforms to be located, the mapping system accepting multiple mobile platform location information and generating a map on which each location is marked.*

*29. A system according to claim 24, wherein data forwarded to said subscriber comprises at least one mobile platform location in a map represented in HTML and an image.*

*30. A system according to claim 23, wherein the communication between said subscriber and said location determination system is over the Internet.*

*31. A system according to claim 23, wherein the communication between said communication system and the corresponding remote tracking service is over the Internet.*

*32. A system according to claim 23, wherein said location determination system, said mapping system and said communication system are accommodated in the same web site.*

*33. A system according to claim 23, wherein said mobile platform is a vehicle.*

*34. A system according to claim 23, wherein said mobile platform is a person.*

*35. A system according to claim 23, wherein each remote tracking system belongs to a different company and supervises a different group of mobile platforms.*

*36. The system according to claim 23, wherein each of the plurality of remote tracking systems includes the tracking unit of a mobile platform.*

*37. The system according to claim 36, wherein the tracking unit of a mobile platform is physically separated from the remote tracking system.*

*38. A method of determining the location of mobile platforms, said mobile platforms between them being locatable by a plurality of remote tracking systems, each which is adapted to determine the location of a respective mobile platform according to a property that is predetermined for each mobile platform, the method comprising:*

*(a) accepting inputs from a subscriber identifying one or more mobile platforms to be located;*

*(b) cross-referencing the mobile platforms to be tracked with the remote tracking systems capable of tracking them;*

(*c*) *determining for each mobile platform an appropriate one of the plurality of remote tracking systems that is capable of locating said mobile platform;*

(*d*) *communicating the identity of the one or more mobile platforms to be located to the determined remote tracking system*(*s*);

(*e*) *causing the remote tracking system*(*s*) *to determine the location of a respective mobile platform according to the property that is predetermined for each mobile platform; wherein said property that is predetermined for each mobile platform is each remote tracking system's identifier of the mobile platform to be located;*

(*f*) *receiving the location of each mobile platform from the respective remote tracking system; and*

(*g*) *transmitting the location of each mobile platform to said subscriber.*

*39. A method according to claim 38, wherein transmitting the location of each mobile platform further comprises correlating the location of each mobile platform with a map database and transmitting a map having marked said mobile platform location*(*s*) *to said subscriber.*

*40. A computer program product comprising a computer useable medium having computer readable program code embodied therein to enable determination of the location of mobile platforms, said mobile platforms between them being locatable by a plurality of remote tracking systems, each which is adapted to determine the location of a respective mobile platform according to a property that is predetermined for each mobile platform, the computer readable program product comprising:*

*computer readable program code for causing a computer to accept inputs from a subscriber identifying one or more mobile platforms to be located;*

*computer readable program code for cross-referencing mobile platforms to be tracked with the remote tracking systems capable of tracking them;*

*computer readable program code for causing the computer to determine for each mobile platform an appropriate one of the plurality of remote tracking systems that is capable of locating said remote platform;*

*computer readable program code for causing the computer to communicate the identity of the one or more mobile platforms to be located to the determined remote tracking system*(*s*);

*computer readable program code for causing the computer to determine the location of a respective mobile platform according to the property that is predetermined for each mobile platform; wherein said property that is predetermined for each mobile platform is each remote tracking system's identifier of the mobile platform to be located;*

*computer readable program code for causing the computer to receive the location of each mobile platform from the respective remote tracking system; and*

*computer readable program code for causing the computer to transmit the location of each mobile platform to said subscriber.*

*41. A computer program product according to claim 39, further comprising computer readable code for causing the computer to correlate the location of each mobile platform with a map database and to transmit a map having marked said mobile platform location*(*s*) *to said subscriber.*

*42. A program storage device readable by a machine, tangibly embodying a program of instructions executable by the machine to perform a method of determining the location of mobile platforms, said mobile platforms between them being locatable by a plurality of remote tracking systems, each of which is adapted to determine the location of a respective mobile platform according to a property that is predetermined for each mobile platform, the method comprising:*

(*a*) *accepting inputs from a subscriber identifying one or more mobile platforms to be located;*

(*b*) *cross-referencing mobile platforms to be tracked with the remote tracking systems capable of tracking them;*

(*c*) *determining for each mobile platform an appropriate one of the plurality of remote tracking systems that is capable of locating said mobile platform;*

(*d*) *communicating the identity of the one or more mobile platforms to be located to the determined remote tracking system*(*s*);

(*e*) *causing the computer to determine the location of a respective mobile platform according to the property that is predetermined for each mobile platform; wherein said property that is predetermined for each mobile platform is each remote tracking system's identifier of the mobile platform to be located;*

(*f*) *receiving the location of each mobile platform from the respective remote tracking system; and*

(*g*) *transmitting the location of each mobile platform to said subscriber.*

* * * * *